(No Model.) 3 Sheets—Sheet 1.
M. COVEL.
AUTOMATIC FEED WATER APPARATUS FOR BOILERS.
No. 376,472. Patented Jan. 17, 1888.
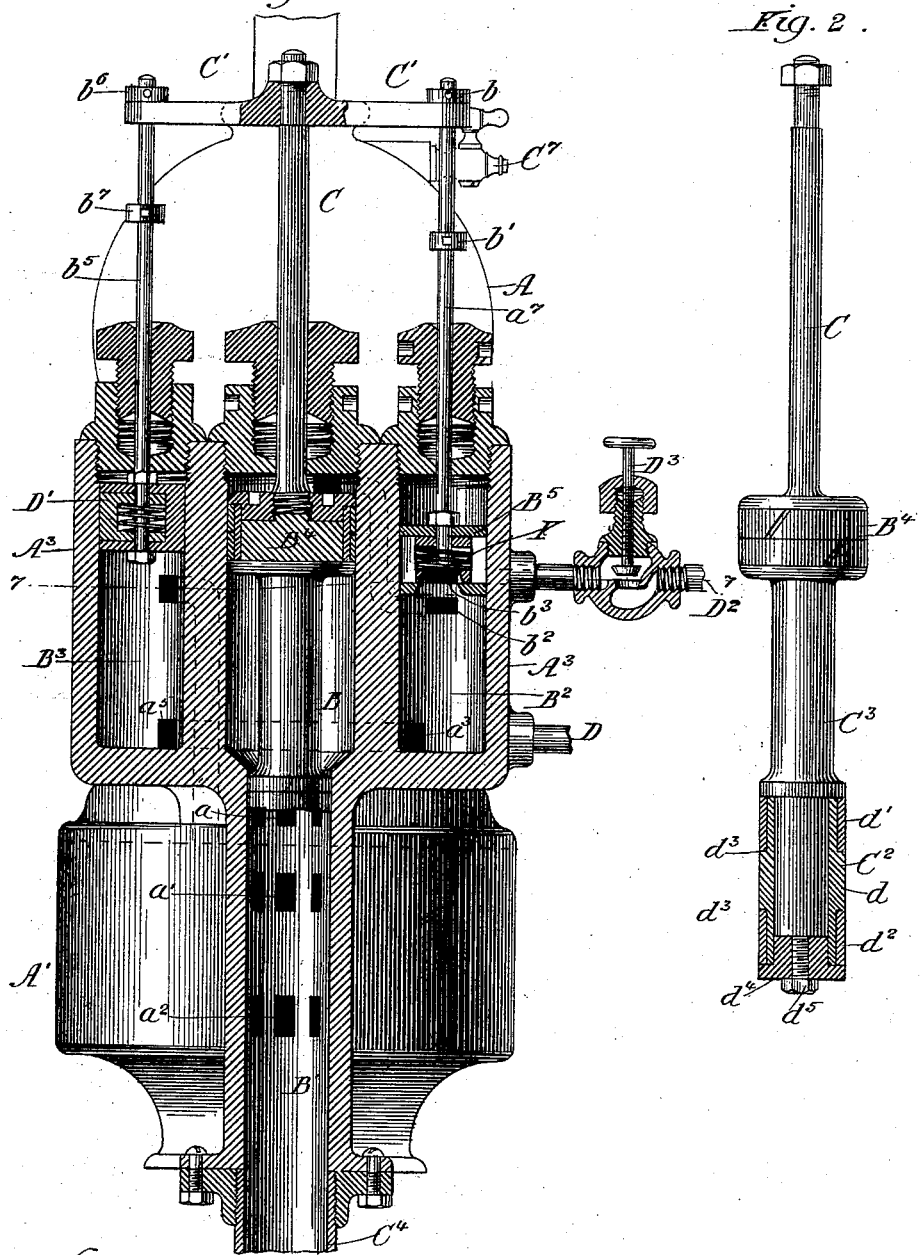

(No Model.) 3 Sheets—Sheet 2.
M. COVEL.
AUTOMATIC FEED WATER APPARATUS FOR BOILERS.
No. 376,472. Patented Jan. 17, 1888.
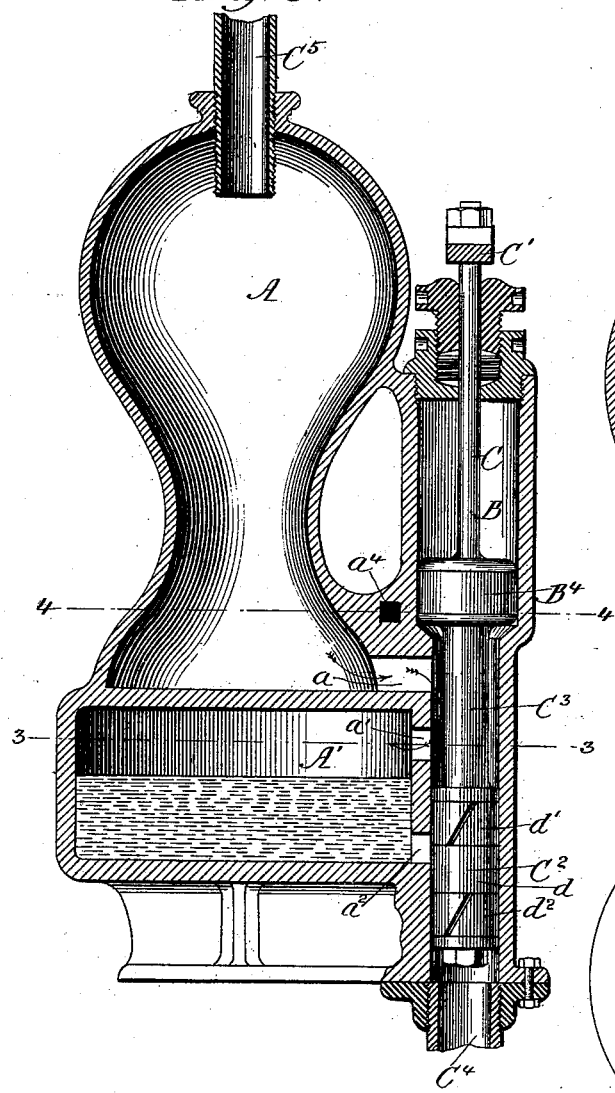
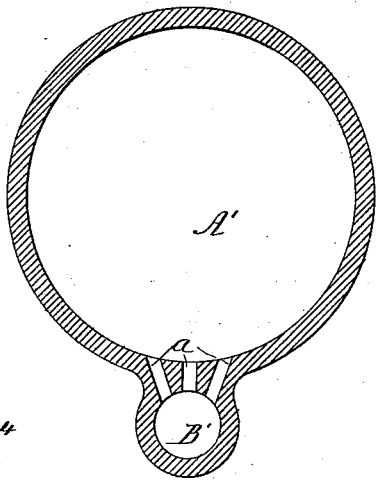
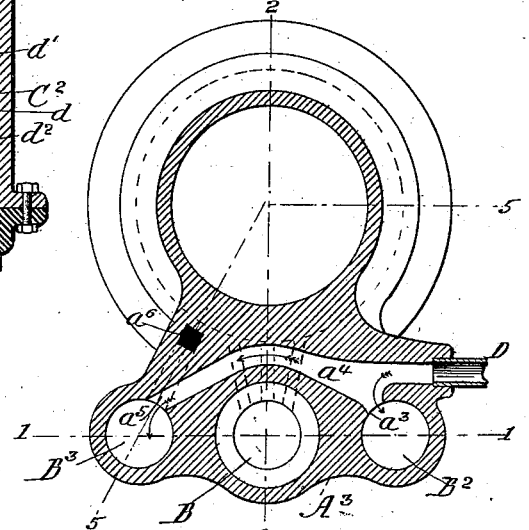
Witnesses:
Frank J. Blanchard
J. P. Dodson
Inventor:
Milo Covel.
By L. B. Coupland & Co.
Attorneys.

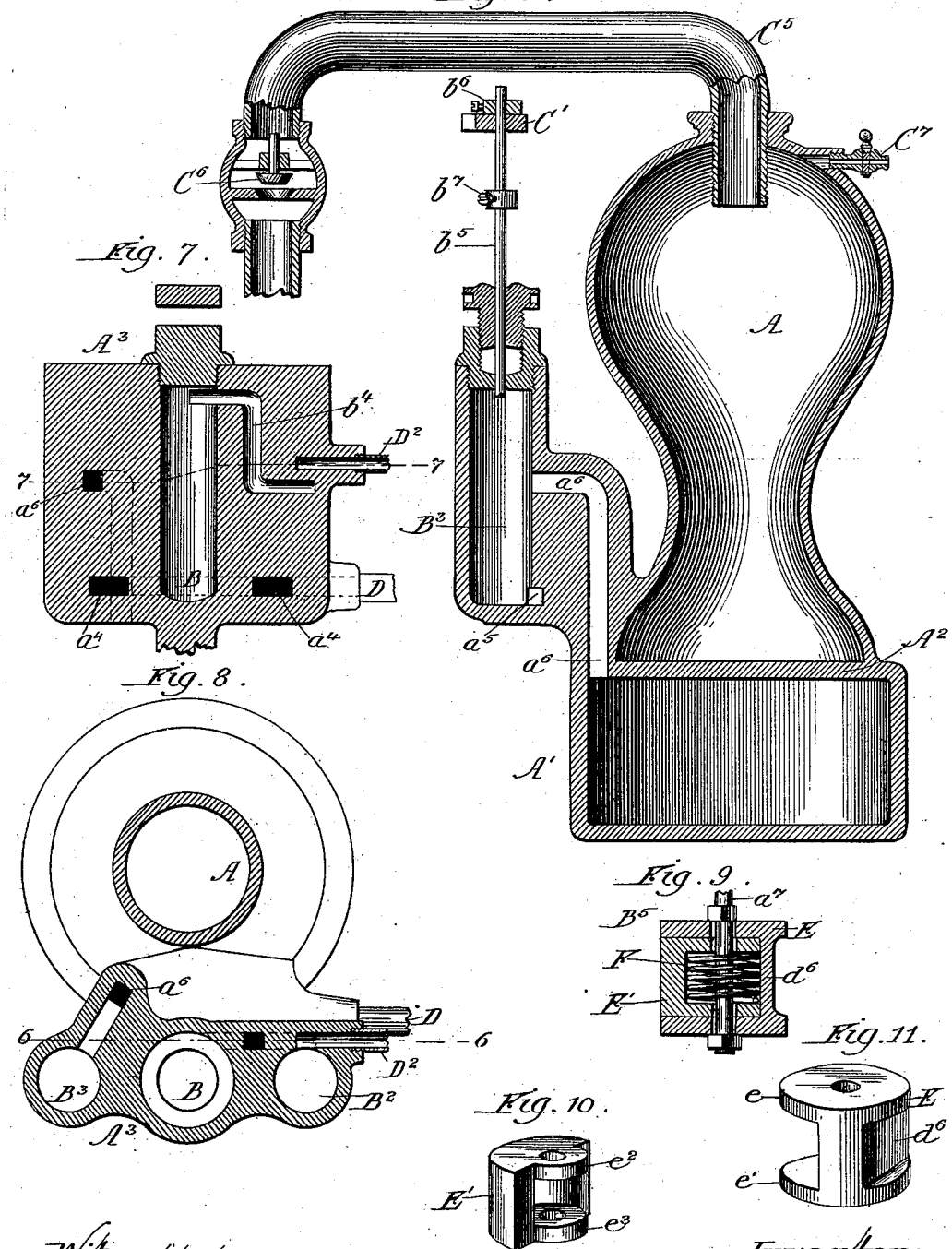

UNITED STATES PATENT OFFICE.

MILO COVEL, OF CHICAGO, ILLINOIS.

AUTOMATIC FEED-WATER APPARATUS FOR BOILERS.

SPECIFICATION forming part of Letters Patent No. 376,472, dated January 17, 1888.

Application filed October 14, 1884. Serial No. 145,475. (No model.)

*To all whom it may concern:*

Be it known that I, MILO COVEL, of Chicago, county of Cook, and State of Illinois, have invented certain new and useful Improvements in an Automatic Feed-Water Apparatus for Steam-Boilers, of which the following is a full, clear, and exact description that will enable others to make and use the same, reference being had to the accompanying drawings, forming a part of this specification.

The object of this invention is to provide an improved feeding apparatus for supplying water to steam-boilers, which shall be automatic in operation, and which consists of certain novel features in the construction, combination, and operation of the several parts, as will be hereinafter more fully set forth and claimed.

Figure 1 is a front elevation and partial section in the plane 1 1, Fig. 5; Fig. 2, a side elevation and partial section of the water piston; Fig. 3, a vertical section in the plane 2 2, Fig. 5; Fig. 4, a horizontal section in the plane 3 3, Fig. 3; Fig. 5, a transverse section in the plane 4 4, Fig. 3; Fig. 6, a vertical section in the angular plane 5 5, Fig. 5; Fig. 7, a vertical section in the plane 6 6, Fig. 8; Fig. 8, a horizontal section in the plane 7 7, Fig. 7; and Figs. 9, 10, and 11, detached details of construction.

Referring to the drawings, A represents a water-reservoir and condensing-chamber, which may be of any desired form and capacity. Below this reservoir is situated the feed-chamber A', separated from the reservoir by the diaphragm A². (Shown in Figs. 3 and 6 and indicated by a dotted line in Fig. 1.)

On the front side of the reservoir and feed-chamber is located the breast A³, which is properly chambered to form the steam and water cylinders and steam-chests. The steam-cylinder B is placed in the middle, as shown in Figs. 1, 5, and 8, the water-cylinder B' being a continuation of the steam-cylinder but of a less diameter. To the right of the steam-cylinder is the steam-chest B², and on the left-hand side is placed the steam-chamber B³. The steam-piston B⁴ is connected to the lower end of the piston-rod C, the upper end of which passes through and is properly secured to the cross-head or bar C'. Below the steam-cylinder is the water-cylinder B', which is of a somewhat less diameter than the upper or steam cylinder. The piston-valve C² is connected with the steam-piston by means of the cylindrical body C³, which is of a less diameter than either the steam-piston or the piston-valve C². This piston-valve might also be termed a "water-piston," as under some circumstances it would have the functions of one and would force the water into the boiler against the pressure; but in this case the piston-valve serves the purpose of opening and closing the several water-ports between the water-reservoir, the feed-chamber, and the passage through which the water passes to the boiler. The body C³, being of a considerable less diameter than either the steam or water cylinders, thus leaves an annular space between said body and the inclosing-wall. The three upper water-ports $a$ in the water-cylinder form a communication between said water-cylinder and the supply-reservoir A. Below these ports are the companion ports $a'$, opening from the water-cylinder into the upper part of the feed-chamber A'. These two sets of ports form the water-passage from the reservoir to the feed-chamber. The lower set of ports, $a^2$, opens into the water-cylinder from the lower part of the feed-chamber, and through these ports the water flows on its way to the boiler. The water-piston is broken away in Fig. 1, uncovering the three series of ports. The movement of the steam-piston and the piston-valve attached to and moving simultaneously with the same is so adjusted and regulated as to open and close these ports at the proper time to produce the required result.

The feed-water pipe C⁴, connected to the lower end of the water-cylinder, leads to and forms a direct connection with the boiler, there being no intermediate valves between said boiler and the feed-chamber.

Water is conducted to the reservoir A by means of the supply-pipe C⁵, inserted in the top of said reservoir and projecting down on the inside a little way, as shown in Figs. 3 and 6, so as to provide a vacuum or air-space in the upper part of the reservoir. A check-valve, C⁶, is placed in this supply-pipe to guard against any back-pressure from the reservoir. The petcock C⁷ provides means for allowing air to enter or escape from the reservoir.

The cylindrical steam-chest B², which is the steam-chest proper, is placed on the right-hand side of the steam-cylinder, and is provided at the back lower end with the steam-supply port $a^3$. (Shown in Figs. 1 and 5.)

D is a steam-pipe which communicates with the curved passage $a^4$, leading through and across the breast $A^3$, back of the steam-cylinder, as shown in Fig. 5, and indicated by dotted lines in Figs. 1 and 7. This passage $a^4$ conducts steam to the steam-chamber $B^3$, situated on the left side of the steam-cylinder, through the steam-port $a^5$, located at the lower end of said chamber. The passage $a^6$, leading from the steam-chamber $B^3$, extends downward and communicates with the feed-water chamber $A'$, as shown in Fig. 6, and by dotted lines in Figs. 1 and 7.

The steam-chest $B^2$ is provided with the piston-valve $B^5$, attached to the lower end of the rod $a^7$. The upper end of this rod passes through one end of the cross head or bar $C'$, and is loosely held in position with relation to said cross-head by means of the collar $b$. On the rod $a^7$, below the cross-head, is placed the companion collar $b'$. By means of these collars the steam-valve $B^5$ may be set to the required position and the travel of the same confined within the desired limit.

$b^2$ represents the steam-port in the chest $B^2$, and $b^3$ the exhaust-port. The live steam on leaving the chest $B^2$ is discharged into the upper end of the steam-cylinder through the passage $b^4$. (Shown in Fig. 7, and indicated by dotted lines in Fig. 1.) Steam only being supplied to the upper side of the piston $B^1$ for the down movement, the up or return movement is caused by the back-pressure from the boiler on the lower end of the water-piston valve $C^2$.

The steam-chamber $B^3$ is provided with the piston-valve $D'$, attached to the lower end of the rod $b^5$. The upper end of this rod passes through one end of the cross-head $C'$, and is loosely held in place by means of the collar $b^6$. Below this cross-head, on the rod $b^5$, is placed the adjustable collar $b^7$. By this arrangement the cross-head will travel down until it strikes the collars on the valve rods or stems before the valves are moved downward, thus conveniently providing means whereby the valves may be properly set with reference to the travel of the steam-piston.

D represents the steam-pipe, and $D^2$ the exhaust-pipe, the latter being provided with the hand-valve $D^3$, as shown in Fig. 1.

The metallic packing of the piston-valve $C^2$ consists of the inside ring, $d$, turned down at both ends, so as to provide recesses for the reception of the two companion rings $d'$ $d^2$, and forming the double shoulder $d^3$ on the inside ring, $d$, as shown in Figs. 2 and 3. The packing-rings are secured in position from the lower ends by means of the follower-cap $d^4$, which projects a short way inside of the ring $d$, and the screw-threaded bolt $d^5$. This form of packing makes a tight joint, so that neither water nor steam can pass through between the joints.

The steam-piston valve $B^5$ is constructed in two parts, as shown in Figs. 9, 10, and 11. The larger part, E, is recessed on the exterior surface, in order to provide the passage $d^6$ for the escape of the exhaust-steam, and cut out on the inner side so as to present the overlapping flanges $e$ $e'$, between which is inserted the companion part $E'$, provided with the perforated lugs $e^2$ $e^3$, the part E being also correspondingly perforated for the passage of the valve rod or stem $a^7$, which locks these parts together. The perforations are of a somewhat greater area than the diameter of the valve-rod, which allows the two parts of the valve to be automatically set out by means of the coiled spring F, recessed in the two parts forming the valve, as shown in Figs. 1 and 9. The lateral pressure of this spring keeps the parts forming the valve up to a close bearing with the inclosing-wall and compensates for the wear. Steam will be allowed to pass up through the valve around the rod or stem, thus having a pressure above as well as below, forming a balance-valve.

The companion piston-valve $D'$ is of precisely the same form of construction, so that a description of one will answer for both.

One of the essential features of this apparatus is that it should be set to bring the top of the feed-chamber on a level with the high-water line in the boiler. Thus it will be impossible to raise the water in the boiler above the diaphragm dividing the feed-chamber from the water-reservoir, as when the feed-chamber is full no more water can enter the same from the reservoir, and then only as evaporated in the boiler. The apparatus, however, continues to work, no matter whether any water is passing into the boiler or not, thereby keeping up a uniform supply to the boiler in the same proportion as the amount evaporated.

The operation of the apparatus is as follows: Fig. 1 shows the steam-piston and valves at the end of the up stroke, the piston-valve $C^2$, covering the upper water-ports forming the communication between the supply-reservoir and the feed-chamber, the lower water-ports leading from the feed-chamber into the supply-passage communicating with the boiler being uncovered. In this position of the apparatus an equilibrium is formed between the feed-chamber and boiler, the water being at the same height in both; but of course no water can enter the feed-chamber from the reservoir to supply the waste in the boiler from evaporation. Steam being admitted through the steam-pipe it reaches both steam-chests and steam-cylinder through the ports and passages already described, the steam passing from the steam-chest $B^3$ down onto the surface of the water in the feed-chamber, through the passage $a^6$, thus equalizing the pressure between the feed-chamber and boiler. When the steam is admitted to the apparatus, the steam-piston starts on the downstroke, the valves in the steam-chests remaining stationary until the cross-head, moving down with the piston-rod, first comes in contact with the lower collar on the valve-rod to the left of the steam-cylinder and moves the valve D' down far enough to close the live-steam passage leading into the feed-chamber, thus shutting out the pressure on top of the water, and at the same time the piston-valve in the water-cylinder has traveled down far enough to uncover the water-ports between the reservoir and feed-chamber and close the lower ports leading from the feed-chamber to the boiler, thus shutting out the back-pressure from the boiler, and thereby allowing the water to flow from the reservoir into the feed-chamber, the water filling the annular space between the cylindrical body $C^3$ and the inclosing-wall of the cylinder. When the steam-piston is on the downstroke, the cross-head is also brought in contact with the lower collar on the valve-rod to the right of the steam-cylinder, at the proper time to move down the steam-valve and cut off the steam from the cylinder, thus stopping the apparatus on the down movement. The back-pressure from the boiler on the lower end of the piston-valve starts the apparatus on the upstroke, the speed being regulated by means of the hand-valve located in the exhaust-pipe, the steam-supply remaining on full head. The collars on the valve-rods must of course be set so that the valves will be moved at the proper time with reference to the steam-piston.

Any live steam that may collect in the feed-chamber can force its way through the water-ports up into the reservoir, where the same will be condensed, thus preventing a pressure from forming in the reservoir.

Having thus described my invention, what I claim as new, and desire to secure by Letters Patent, is—

1. In a boiler-feeding apparatus operated wholly within itself, the combination, with a feed-chamber the highest part whereof is on a level with the high-water line in the boiler, of a water-reservoir located above said feed-chamber and separated therefrom by a horizontal diaphragm, a number of ports or openings forming communicating passages between said feed-chamber and reservoir, a steam-piston and a piston or water valve rigidly connected together in a vertical plane and moving in a continuous cylinder common to both, and the feed-water pipe connected to the lower end of said cylinder and leading to the boiler, all combined and arranged to operate substantially as and for the purpose set forth.

2. In a boiler-feeding apparatus, a supply-reservoir, a feed-chamber, and a breast properly chambered to provide the steam and water cylinders and the steam-chests, all being constructed and arranged in connection with said reservoir and feed-chamber, substantially as and for the purpose set forth.

3. In a boiler-feeding apparatus, the combination, with a supply-reservoir and feed-chamber, of a steam and water cylinder, the latter being a continuation of the former, but of a less diameter, a steam-piston moving in said steam-cylinder, and a piston-valve moving in said water-cylinder, said piston-valve being arranged below said steam-piston and rigidly connected to the same by means of a cylindrical body, whereby said steam-piston and piston-valve are adapted to have a simultaneous movement, substantially as set forth.

4. In a boiler-feeding apparatus, the combination, with a water-cylinder, of a supply-reservoir provided with ports leading into said cylinder, a feed-chamber provided with a second series or set of ports through which the water passes into said feed-chamber from said cylinder, a third series of ports opening from the lower part of said feed-chamber into said cylinder and passage leading to the boiler, and a piston-valve adapted to open and close said ports or passages in the order described, whereby water may flow from the reservoir into the feed-chamber when said piston-valve is on the downstroke, and from the feed-chamber to the boiler when the same is on the upstroke, substantially as set forth.

5. In a boiler-feeding apparatus, the combination, with a steam and water cylinder communicating with each other, but of a different diameter, of a steam-piston, a piston-valve connected to and having a simultaneous movement with said steam-piston, a steam-chest having steam and exhaust ports, a valve moving in said chest, means for adjusting said valve to open and close said ports at the proper time, and a steam-passage leading from said steam-chest into the upper end of said steam-cylinder, whereby steam-pressure is supplied to force the piston or pistons in one direction, the water-pressure from the boiler supplying the pressure for the return-stroke, substantially as and for the purpose set forth.

6. In a boiler-feeding apparatus, the combination, with a feed-chamber, of a steam-chamber, a steam-passage through which steam is conducted into said chamber from the source of supply, a second steam-passage leading from said steam-chamber into said feed-chamber, a piston-valve moving in said steam-chamber for the purpose of opening and closing said steam-passage communicating with said feed-chamber, and means for setting or adjusting said piston-valve to open and close said passage at the proper time with reference to the movement of the steam-piston, substantially as and for the purpose set forth.

MILO COVEL.

Witnesses:
L. M. FREEMAN,
V. STANWOOD.